United States Patent
Salter et al.

(10) Patent No.: US 9,909,747 B2
(45) Date of Patent: Mar. 6, 2018

(54) VEHICLE LIGHTING ASSEMBLY WITH RETRACTABLE COVER PROVIDING DAYLIGHT RUNNING LAMP

(71) Applicant: Ford Global Technologies, LLC, Dearborn, MI (US)

(72) Inventors: Stuart C. Salter, White Lake, MI (US); Aaron Bradley Johnson, Allen Park, MI (US); Stephen Kenneth Helwig, Farmington Hills, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 15/049,239

(22) Filed: Feb. 22, 2016

(65) Prior Publication Data
US 2017/0129394 A1    May 11, 2017

Related U.S. Application Data

(63) Continuation-in-part of application No. 14/934,561, filed on Nov. 6, 2015.

(51) Int. Cl.
| | |
|---|---|
| *B60Q 1/05* | (2006.01) |
| *F21V 23/00* | (2015.01) |
| *F21Y 115/10* | (2016.01) |
| *B60Q 1/00* | (2006.01) |

(Continued)

(52) U.S. Cl.
CPC .......... *F21V 23/003* (2013.01); *F21S 48/145* (2013.01); *F21S 48/1784* (2013.01); *B60Q 1/0052* (2013.01); *B60Q 1/50* (2013.01); *B60Q 2400/30* (2013.01); *B60Q 2400/40* (2013.01); *F21S 48/1168* (2013.01); *F21S 48/1258* (2013.01); *F21Y 2115/10* (2016.08)

(58) Field of Classification Search
CPC ................................ B60Q 1/05; B60Q 1/1438
USPC .................................................. 362/507, 359
See application file for complete search history.

(56) References Cited

U.S. PATENT DOCUMENTS

| | | | | |
|---|---|---|---|---|
| 1,720,531 | A * | 7/1929 | Siegel | G09F 21/04 362/311.03 |
| 3,070,687 | A | 12/1962 | Marchant | |

(Continued)

FOREIGN PATENT DOCUMENTS

| | | |
|---|---|---|
| DE | 202004001269 U1 | 5/2004 |
| EP | 1985913 B1 | 10/2008 |

(Continued)

*Primary Examiner* — Christopher Raabe
(74) *Attorney, Agent, or Firm* — Jason Rogers; Price Heneveld LLP

(57) ABSTRACT

A vehicle lighting assembly configured as a headlamp is provided. The vehicle lighting assembly includes a housing defining a light output window and a light source arranged to direct light through the light output window. The vehicle lighting assembly also includes a retractable cover actuatable between open and closed positions. The cover covers the light output window in the closed position to define a light image pattern for light output. The assembly also includes a retractable cover actuatable between an open position to output headlamp lighting and a closed position to output daylight running lamp lighting, wherein fewer LEDs are activated to generate the daylight running lamp lighting as compared to the headlamp lighting.

17 Claims, 10 Drawing Sheets

(51) Int. Cl.
*B60Q 1/50* (2006.01)
*F21S 8/10* (2006.01)

(56) References Cited

U.S. PATENT DOCUMENTS

| | | | |
|---|---|---|---|
| 4,441,144 A * | 4/1984 | Horiuchi | B60Q 1/18 |
| | | | 280/762 |
| 4,630,178 A * | 12/1986 | Mugford | B60Q 1/05 |
| | | | 362/512 |
| 4,823,237 A | 4/1989 | Horansky et al. | |
| 5,125,714 A | 6/1992 | Lecher | |
| 7,303,319 B2 | 12/2007 | Holtz et al. | |
| 8,070,338 B2 | 12/2011 | Boroczki et al. | |
| 2006/0044848 A1 * | 3/2006 | Suzuki | H02M 5/4585 |
| | | | 363/37 |
| 2009/0231876 A1 * | 9/2009 | Nakamura | B60Q 1/1407 |
| | | | 362/545 |
| 2009/0251915 A1 * | 10/2009 | Boroczki | F21S 48/1778 |
| | | | 362/512 |
| 2012/0147616 A1 * | 6/2012 | Singh | B60Q 1/0041 |
| | | | 362/507 |
| 2013/0249434 A1 * | 9/2013 | Medendorp, Jr. | C09K 11/586 |
| | | | 315/294 |
| 2015/0003091 A1 | 1/2015 | Chen | |
| 2015/0092436 A1 * | 4/2015 | King | F21S 48/1747 |
| | | | 362/513 |
| 2015/0362146 A1 * | 12/2015 | Mochizuki | F21S 48/1159 |
| | | | 362/513 |

FOREIGN PATENT DOCUMENTS

| | | | | |
|---|---|---|---|---|
| EP | 2568210 A1 | | 3/2013 | |
| FR | 2840386 B1 | | 1/2005 | |
| GB | 328733 A | * | 5/1930 | B60Q 1/1438 |
| GB | 1581805 | | 12/1980 | |
| WO | 2013080158 A1 | | 6/2013 | |

* cited by examiner

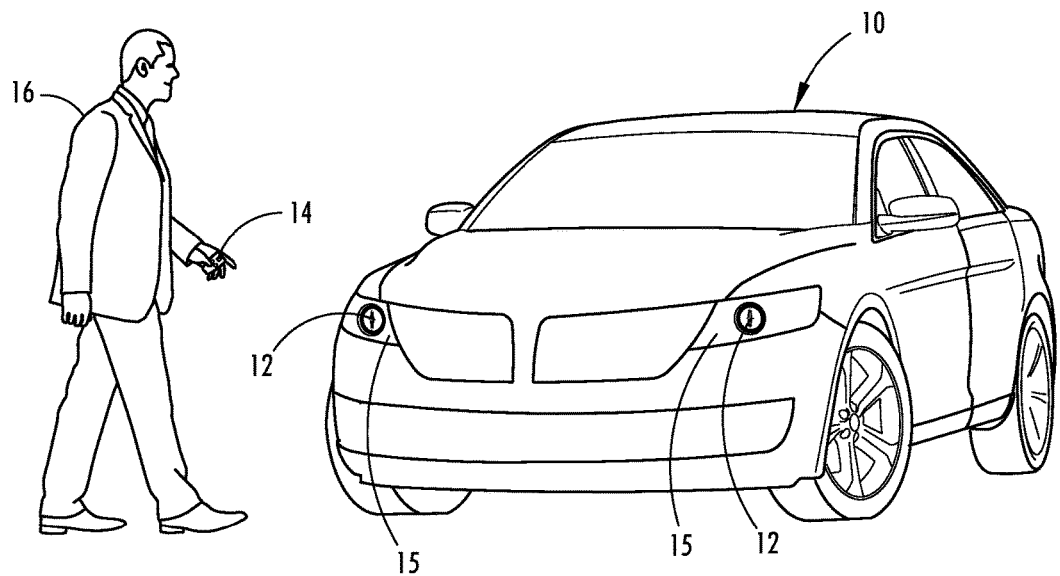
FIG. 1
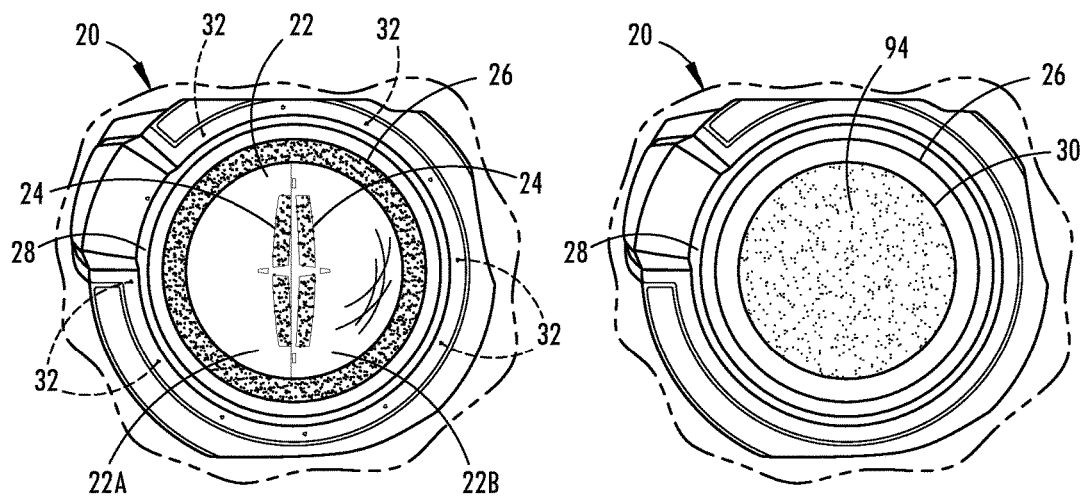
FIG. 2     FIG. 3

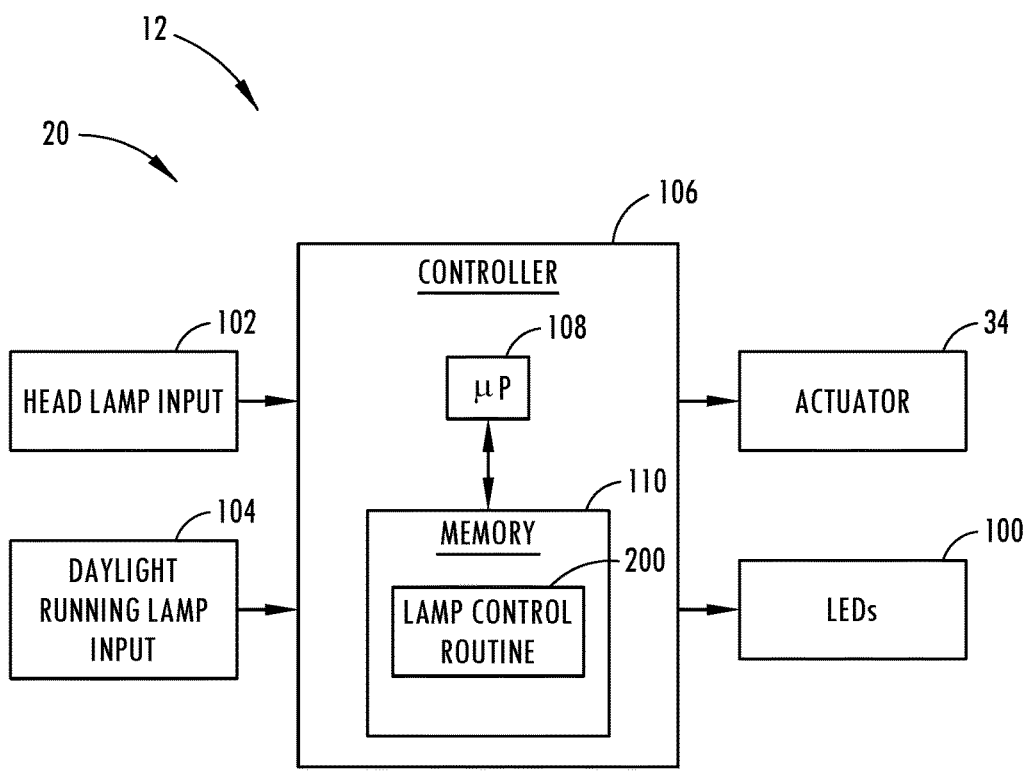
FIG. 12
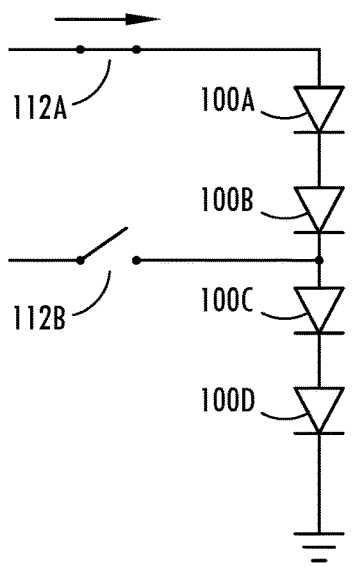
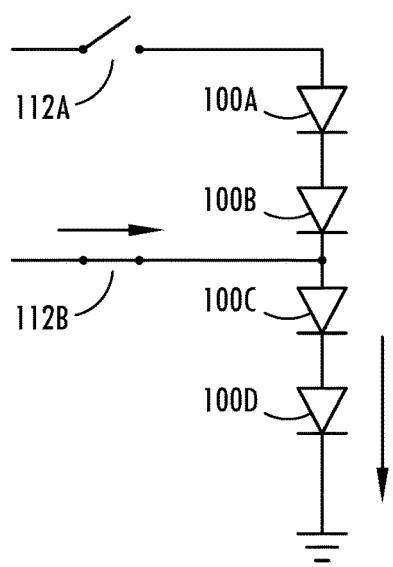
FIG. 13A     FIG. 13B

VEHICLE LIGHTING ASSEMBLY WITH RETRACTABLE COVER PROVIDING DAYLIGHT RUNNING LAMP

CROSS-REFERENCE TO RELATED APPLICATION

This application is a continuation-in-part of U.S. patent application Ser. No. 14/934,561, filed on Nov. 6, 2015, entitled "VEHICLE LIGHTING ASSEMBLY HAVING RETRACTABLE COVER PROVIDING A LIGHTED IMAGE." The aforementioned related application is hereby incorporated by reference.

FIELD OF THE INVENTION

The present invention generally relates to a vehicle lighting assembly, and more particularly relates to a retractable cover for a vehicle lighting assembly that produces a lighted output.

BACKGROUND OF THE INVENTION

Automotive vehicles are typically equipped with a plurality of lighting assemblies for generating light illumination. Typically included on a vehicle is a pair of vehicle headlights or headlamps which project light forward of the vehicle and onto the roadway to enable nighttime driving. The headlamp assembly typically includes one or more lightbulbs or light emitting diodes (LEDs) positioned behind a lens within a housing and mounted to the front side of the vehicle. It would be desirable to provide for enhanced vehicle lighting systems that offer additional lighting functions.

SUMMARY OF THE INVENTION

According to one aspect of the present invention, a vehicle lighting assembly is provided. The vehicle lighting assembly includes a housing defining a light output window, a plurality of LEDs, and a retractable cover actuatable between an open position for headlamp lighting through the light output window and a closed position defining a restricted opening for daylight running lamp lighting. The vehicle light assembly also includes a controller activating a first number of the LEDs to generate the headlamp lighting and a lesser second number of the LEDs to generate the daylight running lamp lighting.

According to another aspect of the present invention, a vehicle headlamp assembly is provided. The vehicle headlamp assembly includes a bezel defining a light output window, a light source comprising a plurality of LEDs arranged to direct light through the window, and a retractable cover actuatable between an open position for headlamp lighting and a closed position for daylight running lamp lighting. The vehicle headlamp assembly also includes a controller for actuating the retractable cover to the open position and activating a first number of LEDs for the headlamp lighting and further actuating the retractable cover to the closed position and activating a fewer second number of LEDs for the daylight running lamp lighting.

According to a further aspect of the present invention, a method of activating a headlamp assembly for a vehicle is provided. The method includes the steps of actuating a retractable cover to an open position to expose a light output window, activating a first number of LEDs to output headlamp lighting from the window, and actuating the retractable cover to a closed position to partially cover the window. The method also includes the step of activating a fewer second number of LEDs to output daylight running lamp lighting from the partially covered window.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a front perspective view of a vehicle equipped with a vehicle headlamp assembly having a retractable cover, according to one embodiment;

FIG. 2 is an enlarged front view of the headlamp assembly illustrating the retractable cover in the closed position;

FIG. 3 is an enlarged front view of the headlamp assembly illustrating the retractable cover in the open position;

FIG. 12 is a block diagram illustrating the headlamp assembly and a controller for controlling the headlamp and daylight running lamp lighting;

FIG. 13A is a circuit diagram illustrating switching circuitry for controlling the LEDs to provide headlamp lighting;

FIG. 13B is a circuit diagram for controlling the LEDs to provide daylight running lamp lighting.

DETAILED DESCRIPTION OF THE PREFERRED EMBODIMENTS

Figure 4:
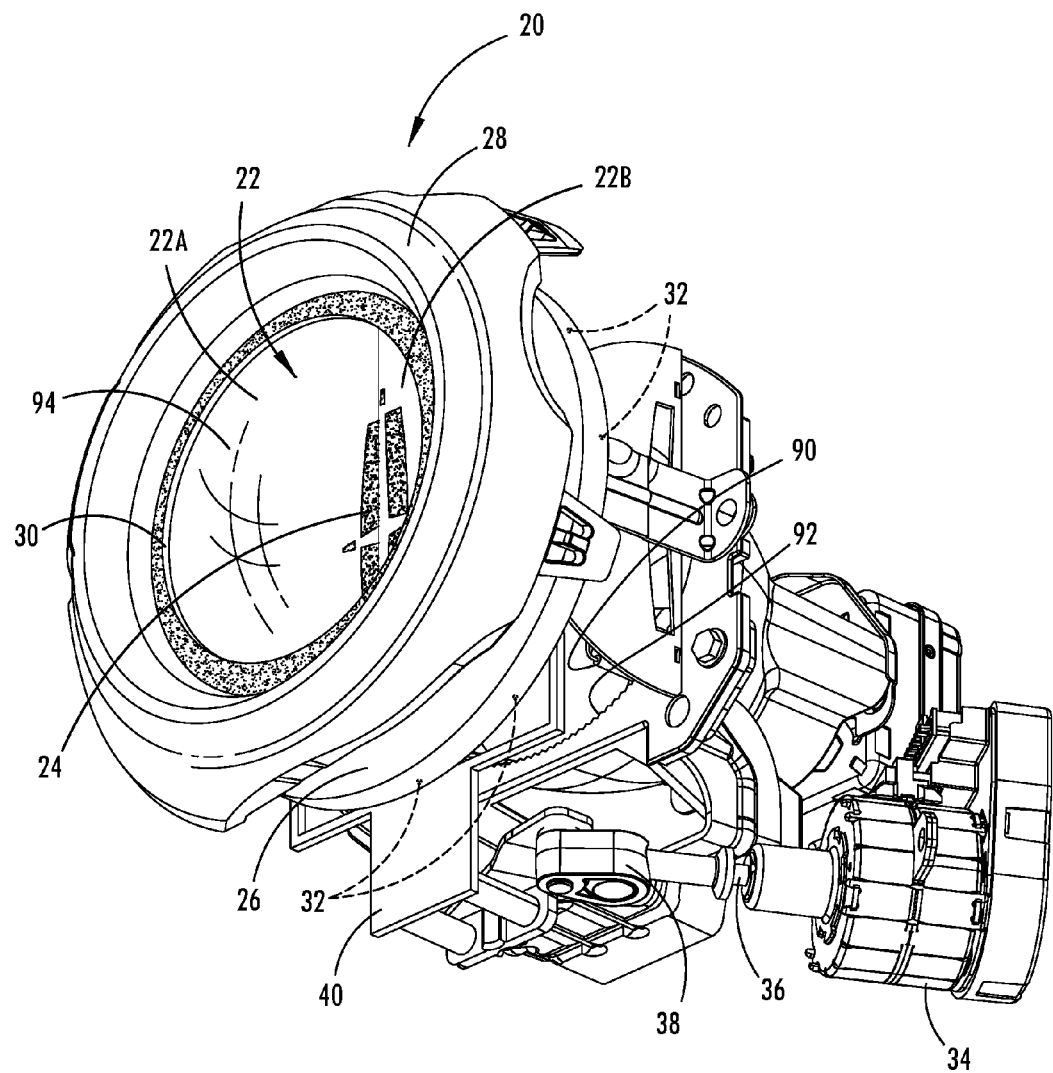
FIG. 4 is a front perspective view of the headlamp assembly shown with the retractable cover in the closed position.

Referring to FIGS. 1-3, an automotive wheeled vehicle 10 is generally illustrated equipped with a pair of lighting assemblies 12 for providing vehicle exterior lighting. In the embodiment shown, the lighting assemblies 12 are configured as headlight or headlamp assemblies positioned near the front side near opposite corners of the vehicle 10. The lighting assemblies 12 provide exterior lighting for the vehicle 10 such as high and low beam headlight illumination that project light forward of the vehicle 10 and onto the roadway. It should be appreciated that the lighting assemblies 12 may be located at other locations on the vehicle 10 and may be configured to provide other lighting functions such as a taillight, a turn light, a fog light, a daytime running light, or other lighting functions.

A vehicle operator (person) 16 is further shown in FIG. 1 approaching the vehicle 10 and possessing a key fob 14 for accessing the vehicle 10 and controlling various vehicle functions. The key fob 14 may be activated by the operator to lock and unlock the vehicle 10, start the vehicle 10, sound a vehicle alarm, unlatch/open or latch/close one or more access doors on the vehicle and control other remote controlled functions. In addition, the vehicle 10 may sense the distance between the vehicle 10 and the key fob 14 and determine if the key fob 14 and the operator 16 possessing the key fob 14 are approaching the vehicle 10 and/or within a certain distance of the vehicle 10. The distance between the key fob 14 and the vehicle 10 may be determined based on the magnitude of a transmitted signal associated with the key fob 14, according to one embodiment. According to other embodiments, the vehicle 10 may be equipped with one or more proximity sensors such as ultrasonic sensors, capacitive sensors, cameras, or other sensors for determining the distance between a person, such as an operator 16, and the vehicle 10.

The vehicle lighting assembly 12 is equipped with a retractable cover assembly 20 having a retractable cover 22 that is actuatable between a closed position shown in FIG. 2 and an open position shown in FIG. 3. The retractable cover 22, also referred to as a retractable shield, substantially covers or shields a light output window 30 of the lighting assembly 12 when the retractable cover 22 is in the closed position. The retractable cover 22 includes an image pattern formed therein for defining a lighted image when the retractable cover 22 is in the closed position. The image pattern may be formed by one or more image pattern openings 24 formed within the retractable cover 22 that define a desired image pattern through which light generated by a light source may illuminate and be viewed from outside the vehicle 10. When the retractable cover 22 is in the closed position as seen in FIG. 2, light produced within the lighting assembly 12 illuminates and exits the image pattern openings 24 defining the lighted image pattern. Accordingly, a lighted image pattern is output from the image pattern openings 24. It should be appreciated that the retractable cover 22 may be actuated to the closed position to provide an illuminated image pattern when the vehicle headlights are not required for vehicle operation, such as when the operator 16 is sensed outside the vehicle 10 and approaching the vehicle 10 within a predetermined distance or when the vehicle 10 is driven in the daylight without the need for headlights. When the vehicle lighting assembly 12 is required to operate as a headlight to light and illuminate the roadway in front of the vehicle 10, the retractable cover 22 is actuated to the open position to leave the light output window 30 exposed or unobstructed by the retractable cover 22 as shown in FIG. 3.

Figure 5:
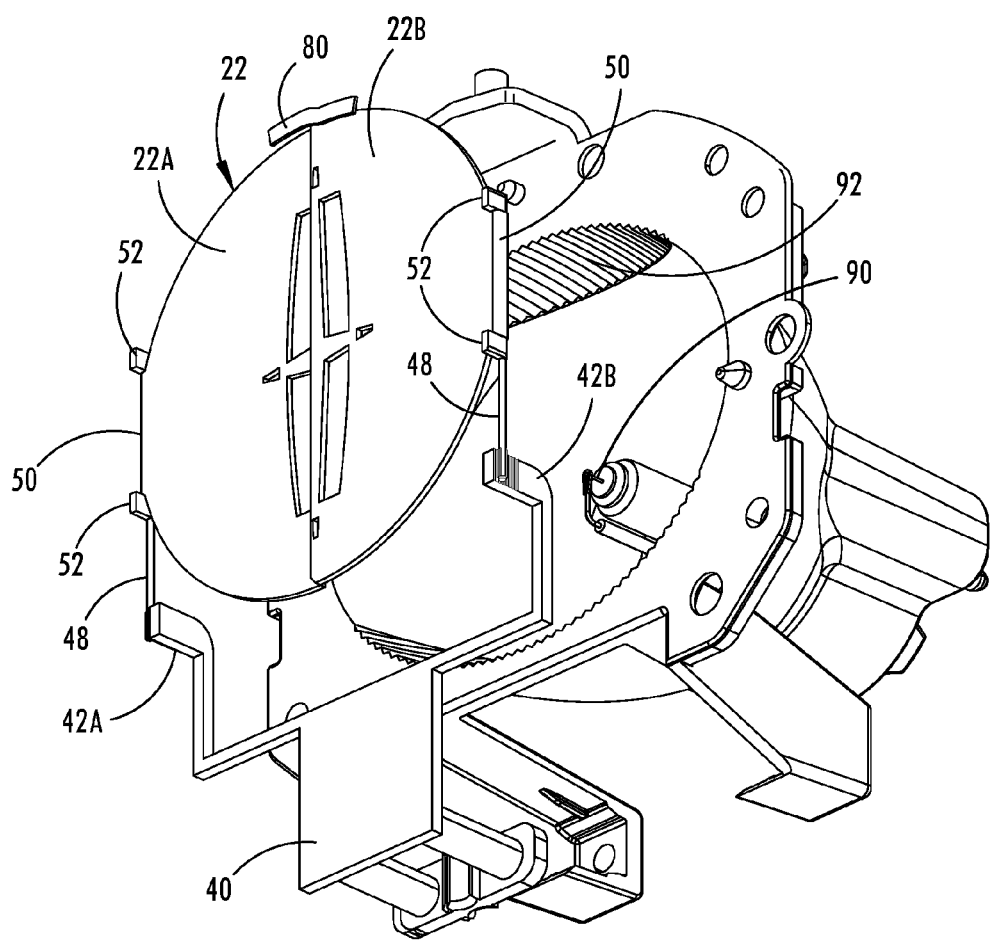
FIG. 5 is a rear view of the headlamp assembly with the retractable cover in the closed position.
Figure 5A:
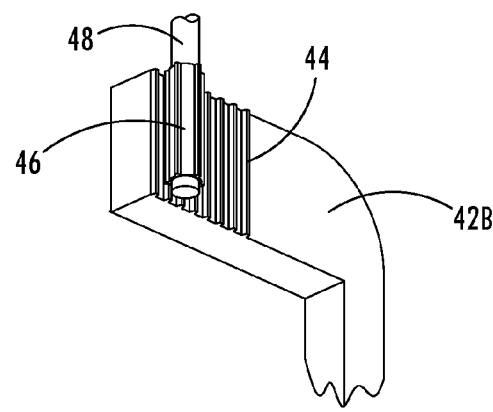
FIG. 5A is an enlarged perspective view of a gear linkage for actuating the retractable cover and shown in the closed position.
Figure 6:
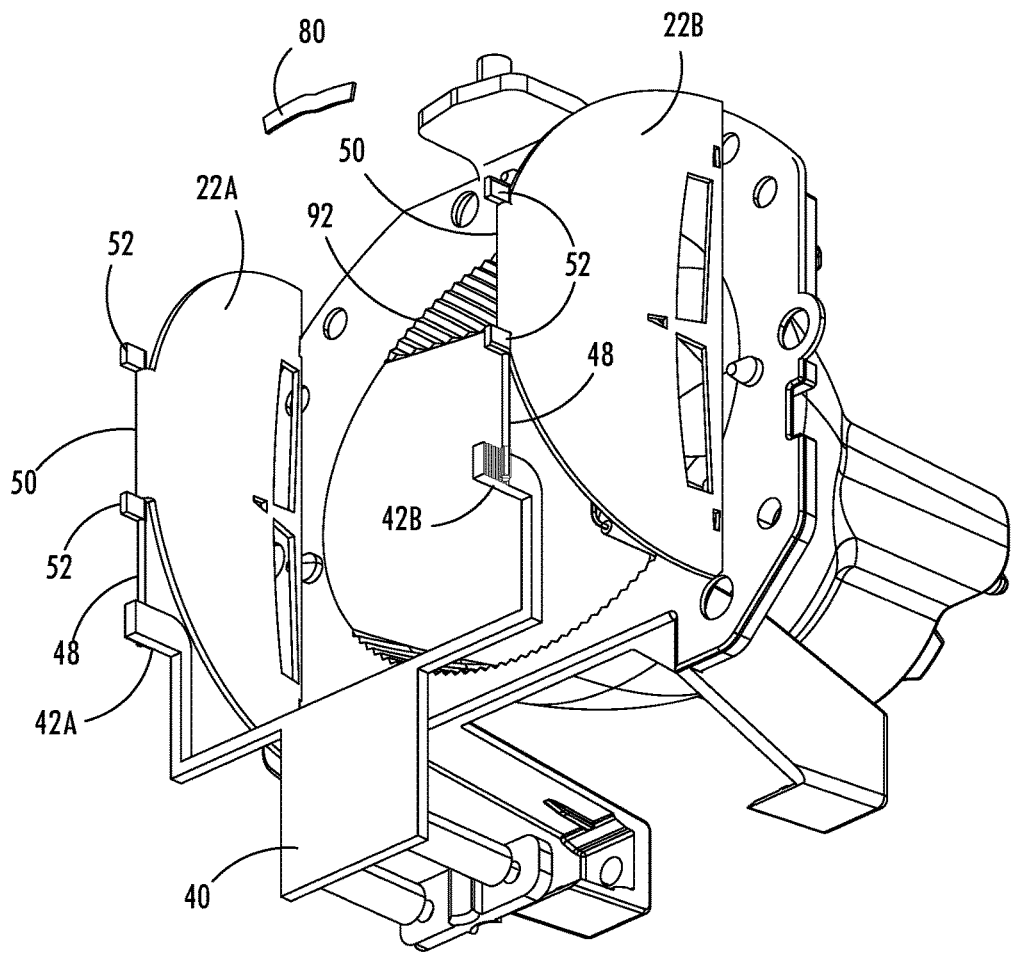
FIG. 6 is a rear perspective view of the headlamp assembly with the retractable cover in the open position.
Figure 6A:
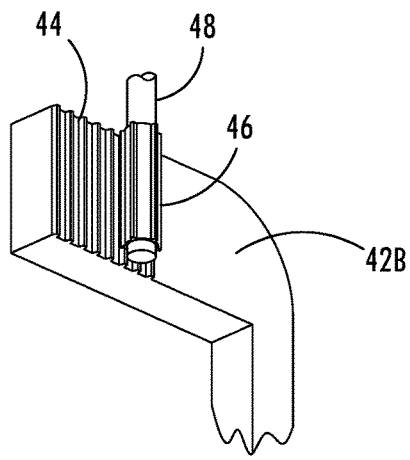
FIG. 6A is an enlarged perspective view of the gear linkage shown in the cover open position.

The retractable cover 22 includes a first pivoting door 22A and a second pivoting door 22B, both of which pivot about respective hinges 50 located on opposite sides of the light output window 30 as seen in FIGS. 5 and 6, according to one embodiment. As seen in FIGS. 4-8, the vehicle lighting assembly 12 includes a housing 28 which generally defines a circular bezel at the front side of the lighting assembly 12 through which light output from one or more light sources may be transmitted within the light output window 30. The housing 28 generally defines and contains an interior of the lighting assembly 12 which includes one or more light sources 90 which may be in the form of one or more incandescent or halogen bulbs or a plurality of light emitting diodes (LEDs). Light generated by the light source (s) 90 passes generally unimpeded through the light output window 30 of the housing 28 to the outside environment when the retractable cover 22 is in the open position. The lighting assembly 12 may further include a reflector 92, such as a parabolic reflector, generally located behind the light source 90. Additionally, the lighting assembly 12 has an inner condenser lens 94 extending across the light output window 30 at the front of the housing 28 forward of the light source(s) 90 and the retractable cover 22. The inner condenser lens 94 may concentrate and collect the light that passes through the light output window 30. The lighting assembly 12 also includes a transparent outer lens cover 15 covering the front side of the housing 28 as seen in FIG. 1.

The retractable cover 22 includes first and second retractable doors 22A and 22B which pivot about hinges 50 on opposite sides of the housing 28 proximate to the light output window 30. The retractable cover 22 is actuatable by an actuator 34 to pivot the retractable doors 22A and 22B between open and closed positions. The actuator 34 may include an electric stepper motor, according to one embodiment. The stepper motor has an output shaft 36 which drives a gearbox 38 to translate rotational motion to a linear motion. The gearbox 38 is connected to a bracket 40 which moves linearly in response to actuation by the actuator 34. The bracket 40 includes a pair of upstanding arms 42A and 42B which translate forward and backwards in concert with the movement of the bracket 40 to close and open the retractable cover 22. Each arm 42A and 42B includes an array of teeth 44 that engage a rotatable toothed gear 46 on a rotary shaft 48. As a result, linear motion of the arms 42A and 42B translates the motion to rotational motion of the rotary shaft 48 which forms a hinge 50 for pivoting the respective retractable doors 22A and 22B. The hinges 50 each have housings 52 supported on opposite ends and rotate in concerts with rotary shaft 48. Rotation of the hinges 50 causes rotation and hence pivoting of the corresponding retractable doors 22A and 22B between the open and closed positions. According to one example, the retractable doors 22A and 22B are rotated at least 90° and may be rotated approximately 100° between the open and closed positions.

Figure 7:
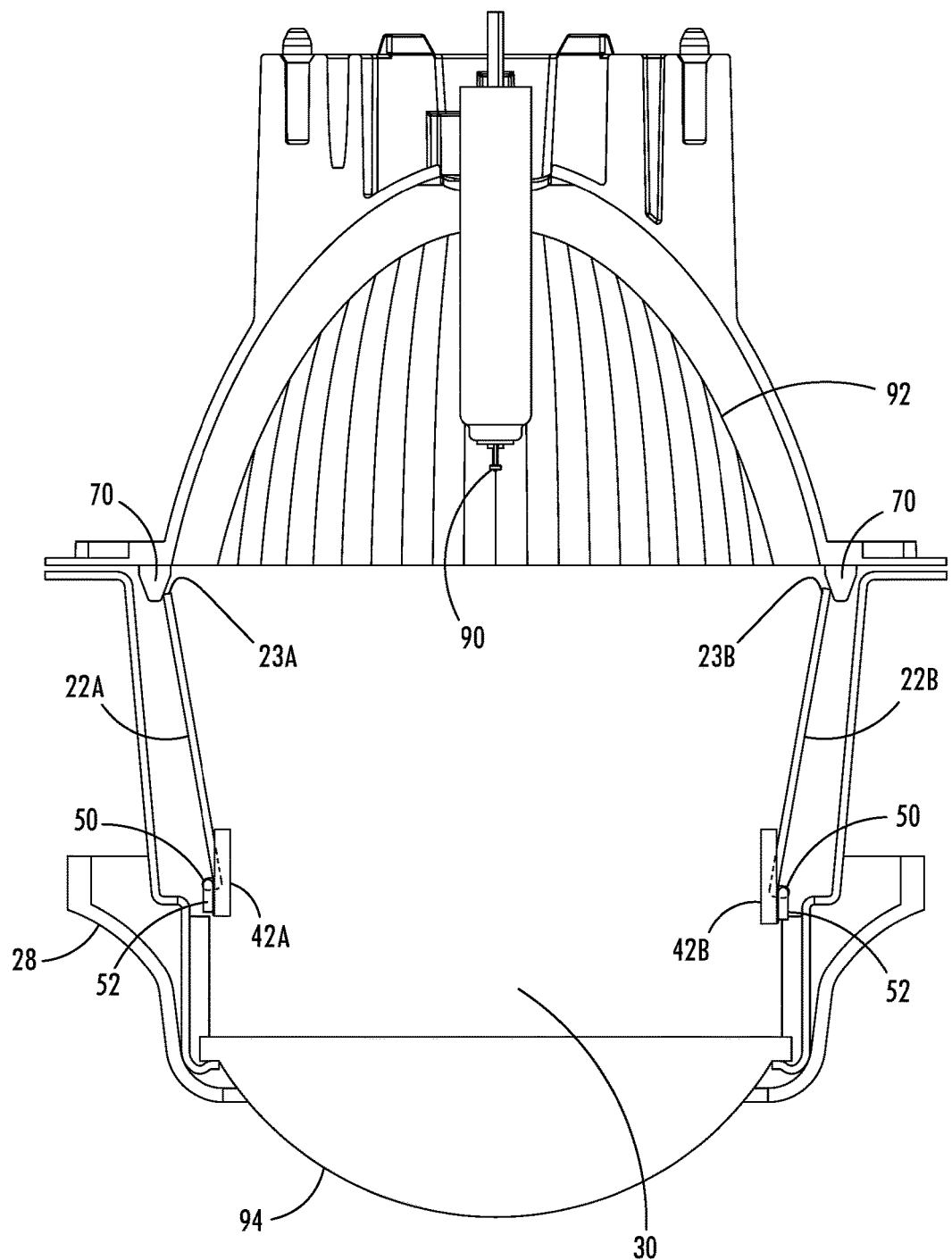
FIG. 7 is a top view of the headlamp assembly with the retractable cover assembly shown in the open position.
Figure 8:
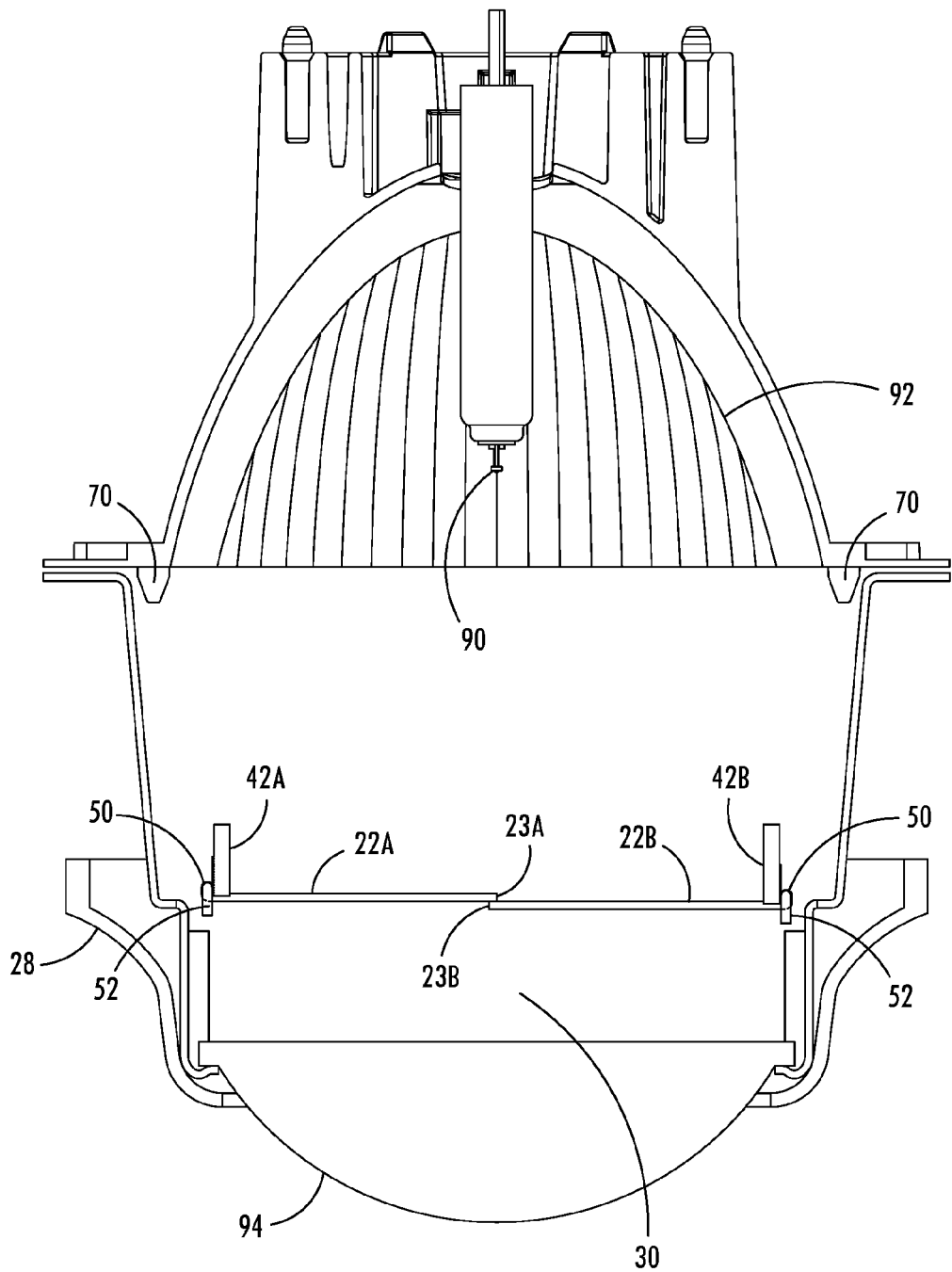
FIG. 8 is a top view of the headlamp assembly with the retractable cover assembly shown in the closed position.

In the open position shown in FIG. 7, both of the retractable doors 22A and 22B pivot inward and expose unobstructively the light source 90 to the light output window 30 and the inner condenser lens 94 at the front of the housing 28. In this position, the retractable doors 22A and 22B abut door stops 70 which prevent further outward movement and help prevent rattling of the retractable doors 22A and 22B during vehicle movement. In the closed position shown in FIG. 8, the first and second retractable doors 22A and 22B substantially close off the light output window 30 within the housing 28 with the exception of the image pattern openings 24 formed therein. As such, light is able to be transmitted through the image pattern openings 24. The first (inboard) and second (outboard) retractable doors 22A and 22B overlap at inner edges 23A and 23B, respectively, as shown in FIG. 8. In the closed position, light may illuminate through the image pattern opening(s) 24 to produce as an output a lighted image. By providing the overlap along the edges 23A and 23B, the leakage of light output between the first and second retractable doors 22A and 22B is minimized.

According to one embodiment, the light source 90 may include a projector lamp that projects light in a desired light beam pattern. In the headlamp embodiment, the projector lamp produces a light beam for use as a headlight. However, it should be appreciated that the light source 90 may include other forms of light generators. The light source 90 may operate at full power for headlight use and at a reduced power, e.g., fifty percent (50%), for illuminating the image pattern in the closed position of the retractable cover 22, according to one embodiment. In another embodiment, the vehicle light assembly 20 may include a light ring 26 that generally extends around an inside circumference of the housing 28 within the bezel. The light ring 26 may include one or more light sources 32, such as LEDs, for illuminating the light ring 26. In one example, the ring has twelve (12) LEDs spaced around the ring light 26. The light ring 26 may be light translucent to transmit light and may form a light blade that transmits light from the light ring 26 into the interior of the housing 28 for illumination through the image pattern openings 24 in the retractable cover 22 when in a closed position. The light ring 26 may also illuminate light on the front side of the light ring 26 to provide an illuminated perimeter of the light output window 30. The light source 90 for the lighting assembly 12 may be employed at a reduced power, e.g., fifty percent (50%) to provide illumination and/or the light ring 26 may provide illumination via light sources 32 when the retractable cover 22 is in the closed position.

Additionally, it should be appreciated that a switch 80 may be provided within the housing 28 to detect when the retractable cover 22 is in either the open position or closed position and to control activation of the light ring 26 and/or light source 90 for illuminating the image pattern opening(s) 24 when the retractable cover 22 is in the closed position. The switch 80 may include a sensor for detecting the closed position of the retractable cover 22 and may also serve as a stop member to limit the inward pivoting of the retractable doors 22A and 22B at the closed position. According to one embodiment, the switch 80 may be located within the bezel of the housing 28 to detect the retractable cover 22 in the closed position as seen in FIG. 4 and may activate the light source 90 at reduced power or the light ring 26 in response thereto. Upon movement of the retractable cover 22 to the open position, the switch 80 may turn off the light ring 26 or adjust the light source 90 to full power for use as a headlight.

Figure 9:
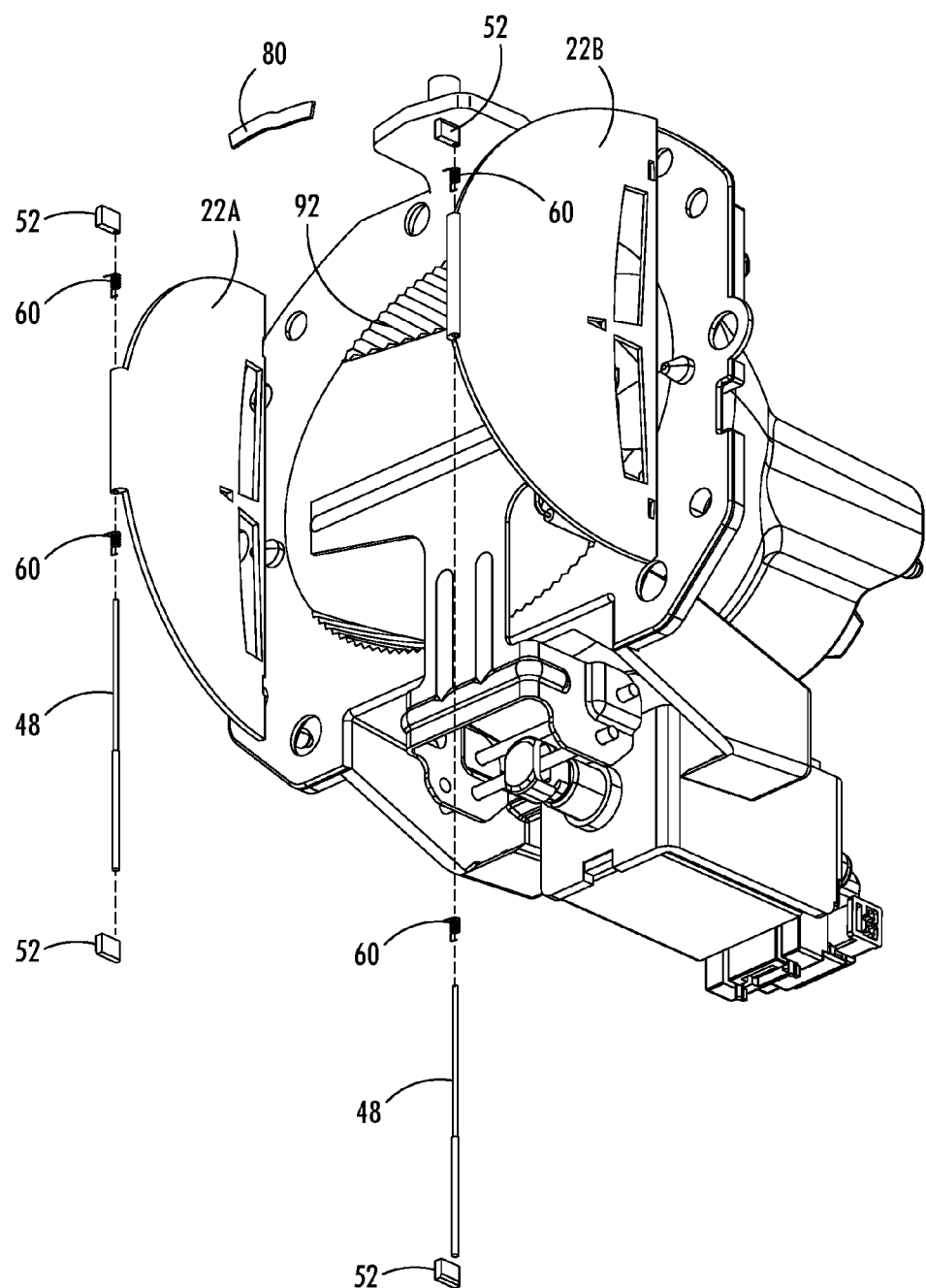
FIG. 9 is a perspective view of the retractable cover assembly further illustrating a bias spring arrangement, according to another embodiment.

The retractable cover assembly 20 may be configured to operate, such that the retractable cover 22 is in a normally open position which enables unobstructive operation of the headlights. According to one embodiment, one or more bias springs 60 may be operatively coupled to the retractable cover 22 to bias the retractable cover 22 with a bias force into the open position as shown in FIG. 9. In the embodiment shown, the bias springs 60 may include coil springs that are disposed within each of the two housings 54 located at opposite ends of hinge 50 for each of the retractable doors 22A and 22B. The bias spring 60 in each housing 52 is positioned to bias the retractable doors 22A or 22B to the normally open position as shown in FIG. 9. It should be appreciated that the retractable cover assembly 20 may include other bias mechanisms, such as one or more springs configured to bias the retractable doors 22A and 22B to a normally open position. When the retractable cover 22 is desired to be moved to the closed position, an actuator 34, such as a motor or solenoid, may be activated to overcome the force of the bias springs 60 to actuate the retractable cover 22 to the closed position. Therefore, in the event of a failure of the retractable cover assembly 20 or a power failure affecting the actuator 34, the retractable cover 22 will remain in the open and unobstructed position and usable for normal headlight functions.

According to one embodiment, the lighted image may be a logo or emblem of the vehicle 10 that is readily recognizable. Any of a number of shapes and sizes of the image pattern opening(s) 24 may be provided. Additionally, any of the vehicle exterior lights may be configured to include the retractable cover assembly 20. The image pattern openings 24 may be formed in one or more members of the retractable cover 22. The retractable cover 22 may be made of a metal or other material. While the retractable cover 22 is shown and described herein as having first and second pivoting doors 22A and 22B, it should be appreciated that other configurations of a retractable cover 22 may be employed, such as one or more sliding doors for moving between an open and closed positions. Further, it should be appreciated that the lighted image pattern may be formed by a translucent material formed within the retractable cover 22, according to another embodiment.

Accordingly, the vehicle light assembly 12 advantageously may be operated to close the retractable cover 22 via the actuator 34 and activate the light source 90 and/or light ring 26 to provide a lighted image pattern through the image pattern opening(s) 24 in the retractable cover 22 in the closed position. This may be desirable when the operator 16 of the vehicle 10 is approaching the vehicle 10 and is within a predetermined distance of the vehicle 10 as sensed by the location of the key fob or other sensor(s). Additionally, the vehicle light assembly 12 may operate to generate the lighted image when the vehicle 10 is driven during daylight times or at other times when full headlight lighting is not required. As such, the lighted image seen in the closed position of the retractable cover 22 provides a styling feature to the vehicle 10.

Figure 10:
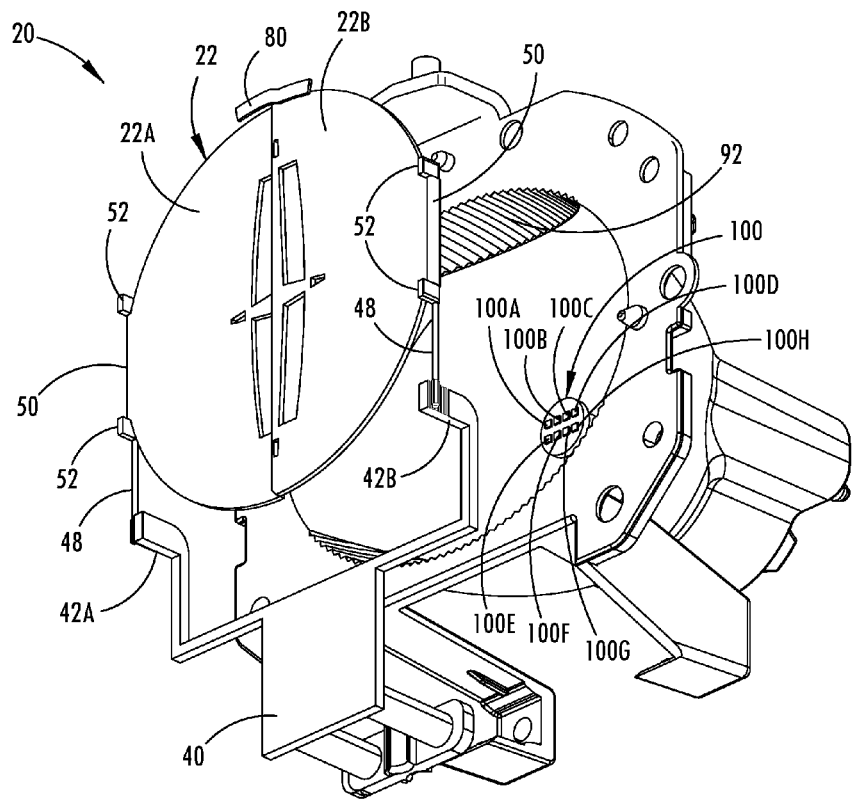
FIG. 10 is a perspective view of a headlamp assembly having a retractable cover assembly and a plurality of LEDs for providing headlamp and daylight running lamp lighting, according to another embodiment.
Figure 11A:
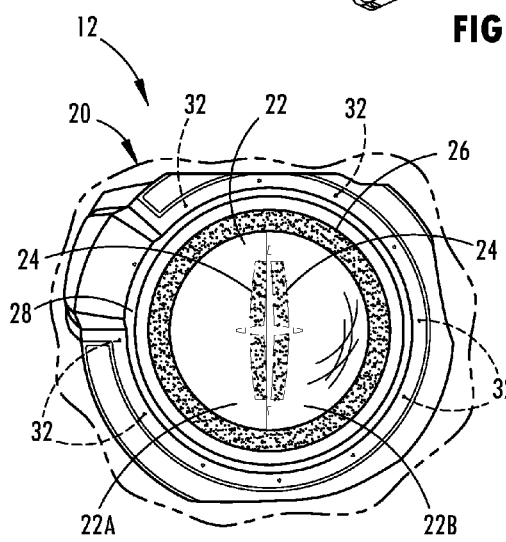
FIG. 11A is a front view of the headlamp assembly illustrating the retractable cover of FIG. 10 in the closed position.
Figure 11B:
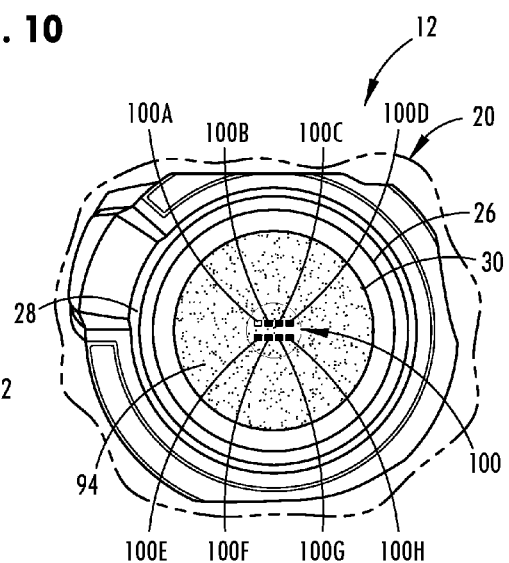
FIG. 11B is a front view of the headlamp assembly illustrating the retractable cover of FIG. 10 in the open position.

The vehicle lighting assembly 12 may be equipped with a retractable cover assembly 20 having a retractable cover 22 and a light source 100 having a plurality of light-emitting diodes (LEDs) as shown in FIGS. 10-11B configured to provide multiple lighting modes, according to another embodiment. In this embodiment, the vehicle lighting assembly 12 has the retractable cover assembly 20 with the retractable cover 22 actuatable between a closed position shown in FIG. 11A and an open position shown in FIG. 11B. In the closed position, the light output window 30 is partially blocked or restricted by the cover 22 which has one or more openings 24 such that less light is able to pass through the window 30. The retractable cover 22 may include the image pattern openings 24 formed therein for defining a lighted image through which light may pass when the retractable cover 22 is in the closed position as described above.

In this embodiment, the lighting assembly 12 is shown provided as an LED headlamp assembly having a plurality of LEDs 100A-100H that serve as the LED lighting source 100, according to one embodiment. The LEDs 100A-100H are shown arranged in two rows of four LEDs, such that the top row of LEDs 100A-100D is above the bottom row of LEDs 100E-100H. The top row of LEDs 100A-100D may be activated to provide lighting for a low beam headlight when the retractable cover assembly 20 has the retractable cover 22 in the open position. The bottom row of LEDs 100E-100H may be activated at the same time as the top row to provide the high beam headlight. In a high beam lighting application, all of the LEDs 100A-100H may be activated to provide a higher intensity light source output through the light output window 30 when the retractable cover 22 is in the open position. It should be appreciated that a greater or lesser number of LEDs may be provided as the LED light source 100.

The light source 100 is located in the housing 28 and positioned with the LEDs 100A-100H to illuminate the light output window 30 such that the light passes through the openings 24 in the retractable cover 22 when the retractable cover assembly 20 is in the closed position as seen in FIG. 11A. As such, the cover 22 blocks or restricts a portion of the light output window 30 and allows light to pass through openings 24. With the retractable cover 22 in the closed position, this may also allow for illumination of the headlamp assembly to provide a welcome or farewell lighting image as described above. In addition, the headlamp assembly 12 may operate as a daylight running lamp (DRL) by activating a fewer number of LEDs to generate the daylight running lamp lighting as compared to the headlamp lighting when the retractable cover is in the closed position. A first number of LEDs are activated in the headlamp lighting mode, whereas a fewer second number of LEDs are activated in the daylight running lamp mode. In one example, two LEDs may be illuminated to provide lighting to generate the daylight running lamp lighting, whereas four LEDs may be activated to provide low beam lighting as compared to eight LEDs activated to provide high beam lighting. For low beam and high beam headlamp lighting, the retractable cover 22 is in the open positon so as not to block light generated by the LED light source 100 from passing through the light opening of the light output window 30. In either low or high beam headlamp light mode, the retractable cover 22 is actuated to the open position and a first number of LEDs (e.g., four or eight) are activated. In contrast, in the daylight running lamp mode, the retractable cover 22 is actuated to the closed position and a lesser amount of light generated by a fewer second number of LEDs 100 (e.g., two LEDs) is generated and output through image pattern openings 24, which may be particularly useful when the vehicle is driving on a roadway.

The vehicle lighting assembly 12 including the retractable cover actuator 20 and the LEDs may be controlled with a controller 106 as shown in FIG. 12. The controller 106 may include a microprocessor 108 or other control circuitry including analog and/or digital circuitry. The controller 106 may include memory 110 which may store a lamp control routine 200 executable by the microprocessor 108. The controller 106 receives inputs from the headlamp input such as high beam and low beam headlamp signals. In addition, controller 106 receives an input from a daylight running lamp input 104. The headlamp input 102 and daylight running lamp inputs 104 may be user controlled inputs, such as switches or control knobs that are activated by a user to turn on the lighting mode that is desired. The controller 106 processes the headlamp input 102 and daylight running lamp input 104 and controls an actuator 34 to actuate the retractable cover 22 between the open and closed positions. In addition, the controller 106 controls the activation of the LEDs 100 to control the number of LEDs that are turned on, and may also control the intensity and color of the LEDs, depending on the lighting mode, such as high beam headlamp, low beam headlamp, daylight running lamp or welcome/farewell lighting.

The controller 106 may include or control switching circuitry as shown in FIGS. 13A and 13B, according to one embodiment. The switching circuitry is shown including switches 112A and 112B connected to the low beam LEDs 100A-100D. Switches 112A and 112B may be controlled by the controller to turn on a select number or group of LEDs to generate a desired lighting output. When switch 112A is in the closed position and switch 112B is in the open position, electrical current flows through each of the four LEDs 100A-100D to provide low beam headlamp lighting with the first number of LEDs. When switch 112A is in the open position and switch 112B is in the closed position, current flows only through two of the LEDs 100C and 100D to provide daytime running lamp lighting with the fewer second number of LEDs. It should be appreciated that other control circuitry configurations may be employed for controlling any number of LEDs to achieve the desired lighting for headlamp and daytime running lamp operations.

Figure 14:
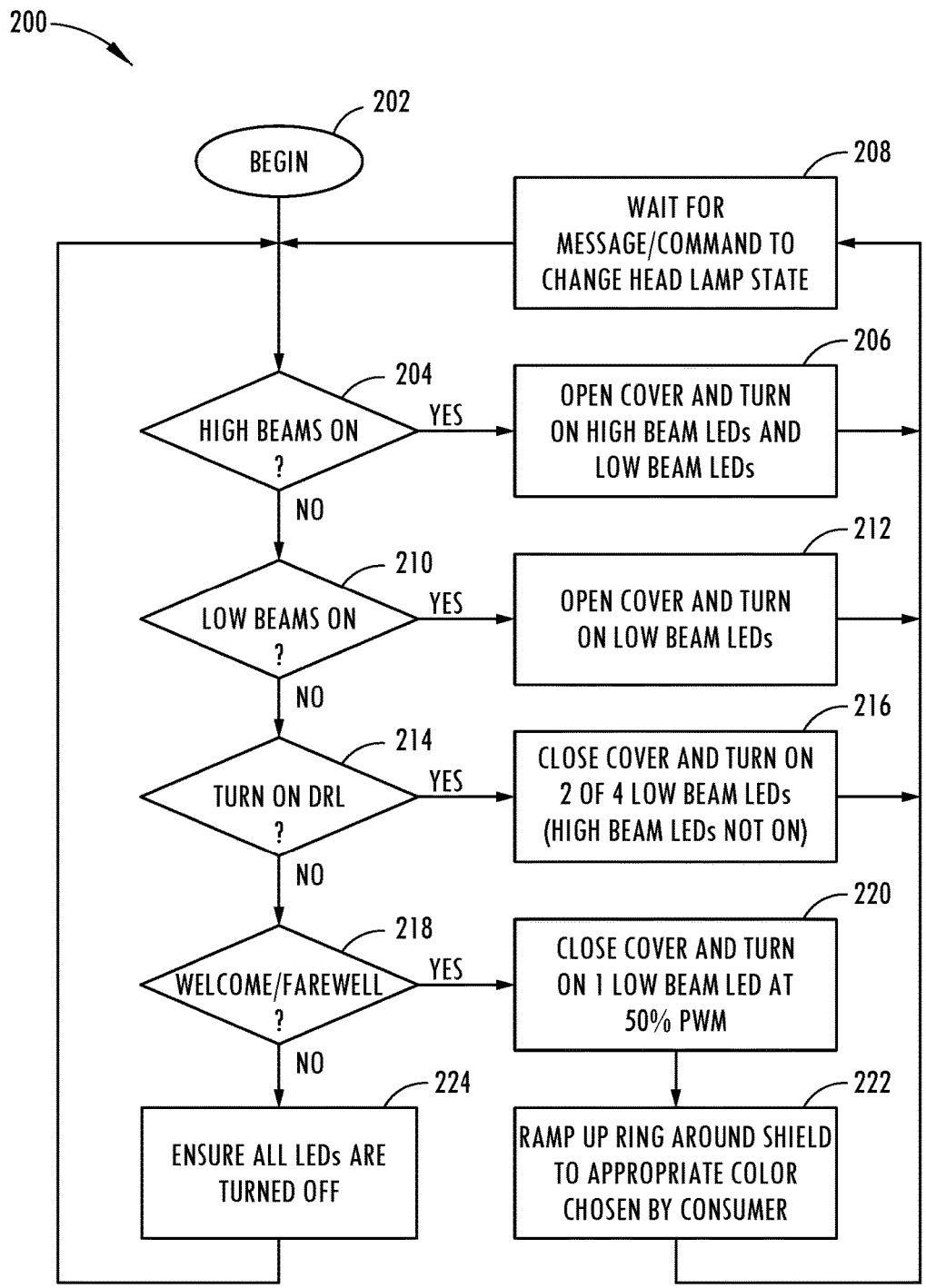
FIG. 14 is a flow diagram illustrating a routine for controlling the LEDs of the headlamp assembly to provide the various modes of lighting.

The lamp control routine 200 is illustrated in FIG. 14, according to one embodiment. Routine 200 begins at step 202 and proceeds to decision step 204 to determine if the headlamp high beams are to be turned on and, if so, actuates actuator 34 to open the retractable cover 22 and turns on the high beam LEDs and low beam LEDs, such that all of LEDs 100A-100H are activated to provide headlamp high beam lighting. Thereafter, routine 200 proceeds to step 208 to wait for a message/command to change the headlamp state before returning to step 204. If the headlamp high beams are not determined to be on at step 204, routine 200 proceeds to decision step 210 to determine if the headlamp low beams are to be turned on and, if so, opens the retractable cover 22 and turns on the first number of low beam LEDs 100A-100D to provide low beam lighting before proceeding to step 208. If the headlamp low beams are not to be turned on, routine 200 proceeds to decision step 214 to determine if the daylight running lamp is to be turned on and, if so, closes the retractable cover and turns on the fewer second number of the four low beam LEDs, which is a fewer number of LEDs than are used for the low beam headlamp lighting, and keeps the remaining high beam LEDs off before returning to step 208. If the daylight running lamp is not to be turned on, routine 200 proceeds to decision step 218 to determine if the welcome/farewell input has been requested and, if so, closes the retractable cover and turns on a fewer third number of one low beam LED at a reduced intensity of fifty percent (50%) pulse width modulation (PWM) so as to provide a low lighting image within the retractable cover at step 220. In addition, at step 222, routine 200 may ramp up the light ring around the shield to the appropriate color light, which may be user selected before returning to step 208. If the welcome/farewell light request has not been provided, routine 200 proceeds to step 224 to ensure that all LEDs are turned off before returning to step 204.

Accordingly, the vehicle lighting assembly 12 advantageously controls the retractable cover 22 and the plurality of LEDs 100 to achieve enhanced lighting for headlamp and daylight running lamp modes from a single headlamp lighting assembly. The lighting achieved may include headlamp lighting for high and low beams, a welcome or farewell lighting at a low light emission and a daylight running lamp having a light emission lower than the low beam lighting. Accordingly, the headlamp assembly may provide enhanced functionality to achieve daylight running lamps and a farewell or welcome lighting without requiring additional components and costs.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle lighting assembly comprising:
   a housing defining a light output window;
   a plurality of LEDs;
   a retractable cover actuatable between an open position for headlamp lighting through the light output window and a closed position defining a restricted opening for daylight running lamp lighting; and
   a controller activating a first number of the LEDs to generate the headlamp lighting and a lesser second number of the LEDs to generate the daylight running lamp lighting, wherein the retractable cover comprises one or more cover portions and one or more image defining openings formed in the one or more cover portions.

2. The vehicle lighting assembly of claim 1, wherein the retractable cover comprises first and second pivoting doors that pivot between the open position and the closed position.

3. The vehicle lighting assembly of claim 1, wherein the retractable cover may be actuated to the closed position and a fewer third number of LEDs activated to generate a lighted image with fewer LEDs activated than for the daylight running lamp lighting.

4. The vehicle lighting assembly of claim 1, wherein the retractable cover is actuated by an actuator.

5. The vehicle lighting assembly of claim 4, wherein the retractable cover is spring biased by a spring and is actuated by the actuator.

6. The vehicle lighting assembly of claim 5, wherein the spring biases the cover to the closed position, and wherein the actuator actuates the cover to the open position.

7. A vehicle headlamp assembly comprising:
   a bezel defining a light output window;
   a light source comprising a plurality of LEDs arranged to direct light through the window;
   a retractable cover actuatable between an open position for headlamp lighting and a closed position for daylight running lamp lighting; and
   a controller for actuating the retractable cover to the open position and activating a first number of LEDs for the headlamp lighting and further actuating the retractable cover to the closed position and activating a fewer second number of LEDs for the daylight running lamp lighting, wherein the retractable cover comprises one or more cover portions and one or more image defining openings formed in the one or more cover portions.

8. The vehicle headlamp assembly of claim 7, wherein the retractable cover comprises first and second pivoting doors that pivot between the open position and the closed position.

9. The vehicle headlamp assembly of claim 8, wherein the first and second doors overlap along an edge in the closed position.

10. The vehicle lighting assembly of claim 7, wherein the retractable cover may be actuated to the closed position and a fewer third number of LEDs activated to generate a lighted image with fewer LEDs activated than in the daylight running lamp lighting.

11. The vehicle headlamp assembly of claim 7, wherein the retractable cover is spring biased by a spring.

12. The vehicle headlamp assembly of claim 11, wherein the spring biases the cover to the closed position, and wherein the actuator opens the cover when energized.

13. A vehicle lighting assembly comprising:
   a housing defining a light output window;
   a light source;
   a retractable cover actuatable between an open position for headlamp lighting through the light output window and a closed position defining one or more image defining openings formed in one or more cover portions of the cover defining a lighted image pattern for daylight running lamp lighting; and
   a controller activating the retractable cover between the open and closed positions.

14. The vehicle lighting assembly of claim 13, wherein the light source comprises a plurality of LEDs.

15. The vehicle lighting assembly of claim 14, wherein the controller activates a first number of the LEDs to generate the headlamp lighting and a lesser second number of the LEDs to generate the daylight running lamp lighting.

16. The vehicle lighting assembly of claim 15, wherein the retractable cover may be actuated to the closed position and a fewer third number of LEDs activated to generate a lighted image with fewer LEDs activated than for the daylight running lamp lighting.

17. The vehicle lighting assembly of claim 13, wherein the lighted image pattern presents a logo.

* * * * *